(12) United States Patent
Bouland et al.

(10) Patent No.: US 11,829,846 B2
(45) Date of Patent: Nov. 28, 2023

(54) QUANTUM SIMULATION OF STOCHASTIC PROCESS

(71) Applicant: QC Ware Corp., Palo Alto, CA (US)

(72) Inventors: Adam Michael Bouland, Oakland, CA (US); Anupam Prakash, Palo Alto, CA (US)

(73) Assignee: QC Ware Corp., Palo Alto, CA (US)

( * ) Notice: Subject to any disclaimer, the term of this patent is extended or adjusted under 35 U.S.C. 154(b) by 0 days.

(21) Appl. No.: 17/865,124

(22) Filed: Jul. 14, 2022

(65) Prior Publication Data

US 2023/0214699 A1 Jul. 6, 2023

Related U.S. Application Data

(60) Provisional application No. 63/295,409, filed on Dec. 30, 2021.

(51) Int. Cl.
*G06N 10/20* (2022.01)
*G06F 17/18* (2006.01)

(52) U.S. Cl.
CPC ............. *G06N 10/20* (2022.01); *G06F 17/18* (2013.01)

(58) Field of Classification Search
CPC ................................ G06N 10/20; G06F 17/18
See application file for complete search history.

(56) References Cited

U.S. PATENT DOCUMENTS

2019/0392340 A1 12/2019 Leipold et al.

OTHER PUBLICATIONS

Ghafari et al. Interfering Trajectories In Experimental Quantum-Enhanced Stochastic Simulation Nature Communications, 2019 (Year: 2019).*
Blank et al. Quantum-Enhanced Analysis of Discrete Stochastic Processes, Nature Partner Journals, Aug. 9, 2021 (Year: 2021).*
Blank, C., et al., "Quantum-enhanced analysis of discrete stochastic processes," *npj Quantum Information*, vol. 7, Article No. 126, 2021, pp. 1-9.
Chakrabarti, S., et al., "A Threshold for Quantum Advantage in Derivative Pricing," *Quantum*, vol. 5, 463, 2021, pp. 1-41.

(Continued)

*Primary Examiner* — Rehana Perveen
*Assistant Examiner* — Cuong V Luu
(74) *Attorney, Agent, or Firm* — Fenwick & West LLP

(57) ABSTRACT

A computing system receives a stochastic process with a plurality of trajectories over time t. The computing system determines a first quantum circuit that, when executed by a quantum computing system, prepares a mixed quantum state ρ' in the quantum computing system, where ' approximates a mixed quantum state of the stochastic process and is defined by:

$$\rho = \sum_{traj} Pr[traj] |\psi_{traj}\rangle\langle\psi_{traj}|,$$

where Pr[traj] is a probability of a trajectory of the stochastic process, $|\psi_{traj}\rangle$ is a quantum state representing a trajectory of the stochastic process and is defined by $$|\psi_{traj}\rangle = \sum_{t} f(t)|t\rangle,$$

where $f(t)$ is based on a value of the stochastic process at time t.

20 Claims, 6 Drawing Sheets

300

Receive a stochastic process with a plurality of trajectories over time t
310

Determine a quantum circuit that, when executed by a quantum computer, prepares a mixed quantum state in the quantum computer that approximates a mixed quantum state of the stochastic process
320

(56) References Cited

OTHER PUBLICATIONS

Cherubini, U., et al., *Fourier Transform Methods in Finance*, vol. 524. John Wiley & Sons, 2010.
Egger, D.J., et al., "Credit Risk Analysis Using Quantum Computers," arXiv:1907.03044, 2019, pp. 1-8.
Ghafari, F., et al., "Interfering trajectories in experimental quantum-enhanced stochastic simulation," *Nature Communications*, vol. 10, Article No. 1630, 2019, pp. 1-8.
International Search Report and Written Opinion, Patent Cooperation Treaty Application No. PCT/US2022/037168, dated Nov. 16, 2022, 15 pages.
Montanaro, A., "Quantum speedup of Monte Carlo methods," *Proceedings of the Royal Society A: Mathematical, Physical and Engineering Sciences*, Sep. 2015, vol. 471, Issue 2181, pp. 1-20.
Nielsen and Chuang, *Quantum Computation and Quantum Information*, 2000, Cambridge: Cambridge University Press.
Rebentrost, P., et al., "Quantum computational finance: Monte Carlo pricing of financial derivatives," *Physical Review A*, vol. 98, Iss. 2, Aug. 2018, arXiv:1805.00109, pp. 1-17.
Wiener, N., "Differential-space," *Journal of Mathematics and Physics*, vol. 2, Issue 1-4, Oct. 1923, pp. 131-174.
Woerner, S. et al., "Quantum risk analysis," *npj Quantum Information*, vol. 5, Article No. 15, 2019, pp. 1-8.

\* cited by examiner

300

┌─────────────────────────────────────┐
│ Receive a stochastic process with a plurality of
│ trajectories over time t
│ 310
└─────────────────────────────────────┘
                    ↓
┌─────────────────────────────────────┐
│ Determine a quantum circuit that, when executed by a
│ quantum computer, prepares a mixed quantum state in
│ the quantum computer that approximates a mixed
│ quantum state of the stochastic process
│ 320
└─────────────────────────────────────┘

FIG. 3

QUANTUM SIMULATION OF STOCHASTIC PROCESS

CROSS-REFERENCE TO RELATED APPLICATION

This application claims priority under 35 U.S.C. § 119(e) to U.S. Provisional Patent Application Ser. No. 63/295,409 "A Method For Simulating Stochastic Processes With A Quantum Computer," filed on Dec. 30, 2021, the subject matter of which is incorporated herein by reference in their entirety.

BACKGROUND

1. Technical Field

This disclosure relates generally to quantum simulations, and more particularly, to simulating stochastic processes using quantum computing systems.

2. Description of Related Art

Oftentimes one wishes to simulate stochastic processes (e.g., to perform financial calculations). Examples include: modeling the price of securities or financial instruments fluctuating over time, the movement of interest rates, etc. This is a subroutine in many quantum computational finance algorithms.

The simulation of a stochastic process can have a particular form. In one example it is assumed that the stochastic process would be modeled as a quantum state of the form $$\sum_{traj} \sqrt{Pr[traj]} |traj\rangle_A |junk\rangle_B$$

Where traj denotes a price trajectory—for example, the value of the security at different times, and Pr[traj] denotes the probability of obtaining that price trajectory under that particular stochastic model. In this representation, the computational basis state of the quantum state in register A represents a price trajectory while the amplitude of the quantum state represents the probability of landing in that trajectory. This state might be entangled with another register B (which is labeled as "junk" as it does not play a role in algorithmic applications).

The state in the equation above is the sort of state one obtains by "quantizing" a classical randomized algorithm simulating a stochastic process. That is, if one has a classical randomized algorithm R simulating the price trajectory—which takes as input a random seed r and outputs a price trajectory with the appropriate probability—then preparing an equal superposition over random seeds r and (coherently) passing it through a reversible compilation of R yields a state of the desired form.

However, the above quantum stochastic process simulation subroutine may be difficult on a near-term quantum computing system, as one must run the classical simulation algorithm in superposition. This could be a bottleneck in the near-term applicability of quantum algorithms which use stochastic process simulation as a subroutine, such as quantum algorithms for Monte Carlo.

SUMMARY

We have developed a new method to simulate stochastic processes on a quantum computing system. A stochastic process may be represented by a probability distribution over (e.g., random or semi-random) variables that can represent, for example, the value of a quantity fluctuating in time. This new simulation method can then be used as a subroutine in quantum algorithms, for example in quantum Monte Carlo algorithms to price derivatives and perform risk calculations. Our simulation method makes use of three points described below.

Point 1: A new way of representing a price trajectory as a quantum state in an inherently analogue fashion, where the price of the security at time t is stored in the amplitude of the quantum state rather than its computational basis state.

Point 2: A new application of a real version of the quantum Fourier transform, known as the discrete cosine transform (DCT). We use the DCT to transform this analogue state into its Fourier basis. In this basis oftentimes a stochastic process has a simpler representation, e.g. in the case of Ito processes such as Brownian motion and its generalizations.

Point 3: Using a quantum data loader (further described in U.S. patent application Ser. Nos. 16/986,553 and 16/987,235) to load the Fourier transform of the stochastic process. In particular we use the data loader recursively, first using the data loader algorithm to prepare a quantum state encoding a probability distribution over data loader angles which, when passed through the data loader, prepare the distribution on the DCT of the desired stochastic process. See FIG. 1 for an example of this recursion as a quantum circuit diagram.

One can then use this representation as a subroutine in many quantum algorithms, for example quantum Monte Carlo algorithms to price derivatives.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 3 is a flowchart describing another method for simulating a stochastic process using a quantum computing system, according to an embodiment.

DETAILED DESCRIPTION

Figure 1:
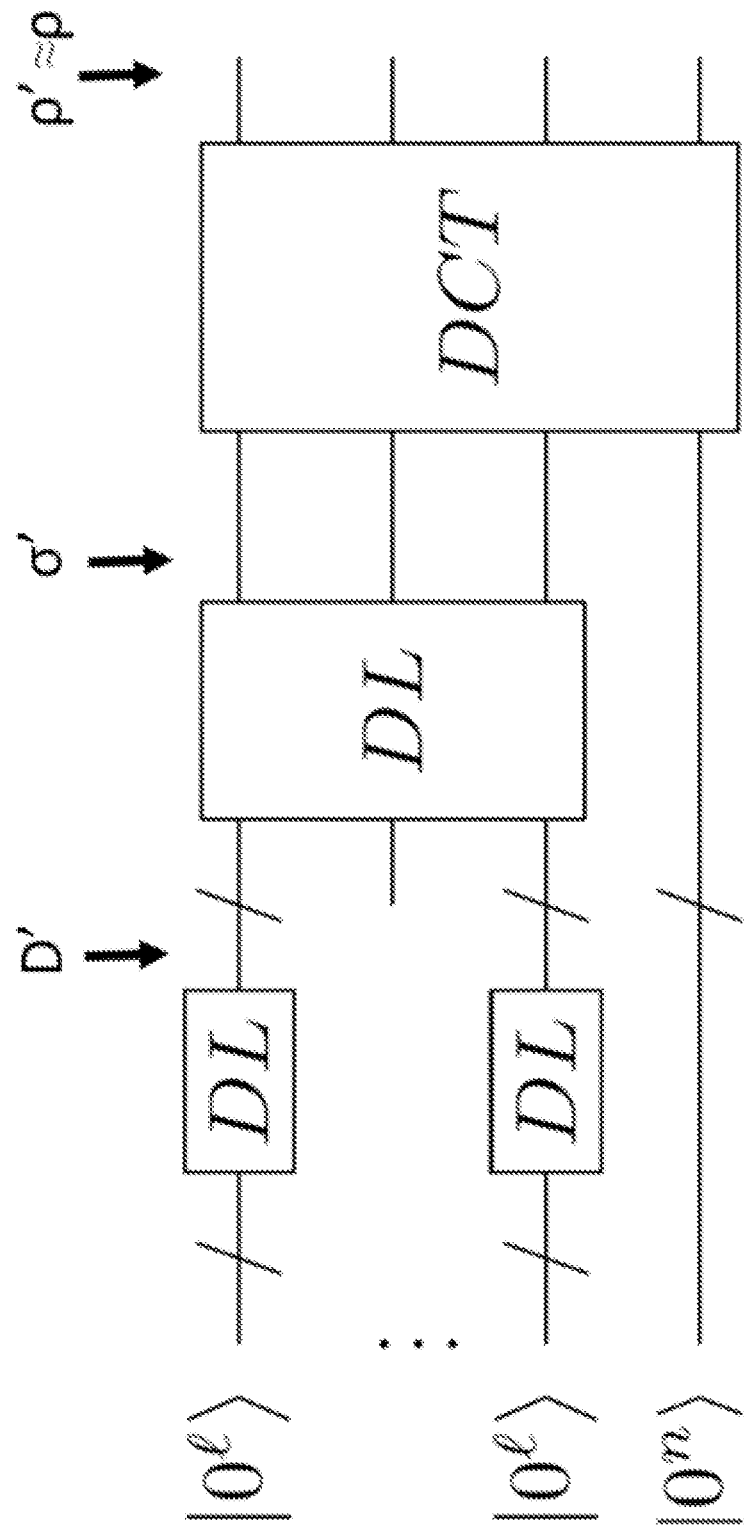
FIG. 1 is an example quantum circuit diagram of an implementation of the algorithm, according to an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Point 1: create a quantum state which is a fundamentally different representation of the stochastic process. In our approach, the basis state of the quantum computing system in register A is the time, and the amplitude is a function of the price of the security at that time. In that way a single quantum state encodes a particular price trajectory $$|\Psi_{traj}\rangle = \sum_{times\ t} f(\text{price}(t))|t\rangle_A$$

This is in some sense an analogue representation of a price trajectory. Here and throughout this document we suppress normalization factors, which we address later.

Such states can be used in quantum algorithms for a variety of financial instruments. For example, if f is trivial, then the inner product between $|\Psi_{traj}\rangle$ and an equal superposition over a subset of times is precisely the average value of the stock during that time period (up to normalization), so such states could be used in the quantum Monte Carlo pricing of Asian options, to give one example.

A stochastic process describes a probability distribution over such states $|\Psi_{traj}\rangle$. Therefore in order to quantumly simulate a stochastic process in this form, we wish to prepare the mixed state:

$$\rho = \sum_{traj} Pr[traj]|\Psi_{traj}\rangle\langle\Psi_{traj}|$$

Point 2: instead of preparing this state directly, the discrete cosine transform (DCT) of this state is prepared. The DCT is the real part of the Quantum Fourier Transform of a quantum state, and the discrete sine transform (DST) is its imaginary part. More formally, if the QFT on n qubits is defined as $$QFT_{ij} = \omega^{ij},$$

where $\omega = e^{2\pi i/N}$ where $N = 2^n$ is the dimension of the Hilbert space then we have that $$DCT_{ij} = \cos(2\pi ij/N)$$

which is a unitary matrix.

The DCT can be performed efficiently on a quantum computing system by modifying the standard algorithm for the QFT. In particular one can perform the DCT on 2n+1 qubits using O(nlog n) gates. This is because the DCT is the real part of the QFT, the QFT admits an algorithm with 2n qubits and O(nlogn) two-qubit gates, and there are methods to perform the real part of a complex quantum circuit using the same number of gates and one additional qubit (for an example method, see: Michael Nielsen and Isaac Chuang (2000). Quantum Computation and Quantum Information. Cambridge: Cambridge University Press.).

To prepare our desired state $\rho$ to simulate the stochastic process, we instead prepare the state:

$$\sigma = DCT^{-1}\ \rho\ DCT$$

After preparing this state a, we then apply the DCT algorithm to obtain $\rho$, which is our quantum simulation of the stochastic process. Therefore, the only step remaining to be described in our method is to prepare the state $\sigma$ or a close approximation thereof We now note that by linearity, $\sigma$ is the DCT of our stochastic process. For many stochastic processes used in finance, for example Ito processes, this DCT has an explicit mathematical description given in the mathematics literature. This is often used many places in computational finance. For example, if price(t) is governed by Brownian motion (more formally, a Brownian bridge which returns to the origin in time $\pi$), then if one writes:

price(t)=$a_0 + a_1\cos(t) + a_2\cos(2t) + a_3\cos(3t) + \ldots$

Then Brownian motion is reproduced when $a_k$ is distributed as $N(0,1)/k$—i.e. as a Gaussian of unit variance divided by k. In other words, the DCT of Brownian motion is a vector of independent Gaussians of decreasing magnitude. For the rest of this section, we will refer back to this example frequently to illustrate our method.

Therefore, the next step of our method is to find the DCT of our desired stochastic process S analytically, which is may be found in the mathematical literature. Therefore, if price(t) is governed by S, this induces a probability distribution D over the coefficients $a_0, a_1, a_2 \ldots$.

The next step is to truncate this DCT series at a finite value of k>0. This omits high-frequency content from the stochastic process, which introduces a small amount of error in the simulation. Given a desired accuracy level of simulation (say 1% error), the value of k can be set by the user accordingly to achieve that error. For most cases of practical interest setting e.g. k=100 suffices. We approximate $\sigma$, the true DCT of the stochastic process, using this kth order truncation, call it $\sigma'$.

Therefore our problem reduces to: given a number k (the truncation parameter) and a description of the probability distribution D over the DCT coefficients $a_0, a_1, a_2 \ldots a_k$, prepare a quantum state $\sigma'$ encoding this distribution D. In other words, we wish to create a probability distribution over quantum states $|v\rangle$ whose first k+1 amplitudes are $a_0, a_1, a_2 \ldots a_k$, and the rest of the amplitudes are zero, and the probability that we prepare $|v\rangle$ is specified by the distribution D. In quantum notation, we prepare the following density matrix: $v' = E_{v \sim D} v \rangle \langle v|$. For example, in the case of Brownian motion, our goal is to load a vector of independent Gaussians of length k of decreasing variance.

We now describe our Point 3, which is to use a quantum data loader to prepare v'—which is (e.g., approximately) the DCT of our stochastic process. Applying the DCT to the state v' will prepare the state $\rho'$, which is approximately our stochastic process.

The quantum data loader is an algorithm A which prepares generic quantum states. The algorithm takes as input quantum registers containing various real angles $\theta_i$ as well as an initial state $|0^n\rangle$. It then prepares a quantum state $|\phi(\theta_i)\rangle$. In other words, A $|\theta_i\rangle|0^n\rangle|\theta_i\rangle|\phi)\theta_i\rangle$ (quantum data loaders are also described U.S. patent application Ser. Nos. 16/986, 553 and 16/987,235, which are incorporated herein).

Therefore for each vector $v = a_0, a_1, a_2 \ldots a_k$ of length k we wish to load, there is a corresponding setting of the angles $\theta_i(v)$ which cause $|\phi(\theta_i)\rangle = |v\rangle$. In other words, $\theta_i(v)$ is the inverse of the data loader map taking angles to vectors.

The probability distribution D induces a distribution D' on angles $\theta_i$ through this inverse map. In other words, D' is the distribution on data loader angles $\theta_i$ for which, if we draw $\theta_i$ from the distribution D' and prepare the state $|\phi(\theta_i)\rangle$ using the data loader with $\theta_i$ as the inputs, then this prepares the same density matrix $\sigma'$ as obtained by drawing v from D and preparing the state $|v\rangle$. More formally, $$\sigma' = E_{\theta_i \sim D'}|\psi(\theta_i)\rangle\langle\psi(\theta_i)|.$$

For example, suppose D is a distribution of length k independent identically distributed N(0,1) Gaussian entries. Then one can explicitly compute D'—in particular, one can prove the distribution D' on the $\theta_i$ may all be independent in the binary data loader algorithm, and the distribution of the angle $\theta$ at the jth level of the data loader tree is given by the probability density function $\cos^j(\theta)\sin^j(\theta)$.

The point of the algorithm is to "data load the dataloader," i.e. to apply the data loader algorithm A twice in series in order to prepare $\sigma'$. The data loader may be applied with different angles each time.

That is, we first use the data loading algorithm A to load a quantum state $|D'\rangle$ which, upon measurement, yields the probability distribution D'. In other words, create the state:

$$|D'\rangle = \Sigma \sqrt{\Pr(\theta_j)} |\theta_j\rangle.$$

This is performed using our analytical description of D' to find angles $|\varphi\rangle$ for which $A|\varphi i\rangle |0^n\rangle = |\varphi i\rangle |D'\rangle$. Note that D' in FIG. 1 represents $|D'\rangle$ in the equation above (FIG. 1 is further described below).

We then apply the data loader algorithm A using $|D'\rangle$ as the input to the $\theta_i$ register. One can then see that tracing out the first register of $A |D'\rangle |0^n\rangle$ yields the state $\sigma'$ as desired. This completes the algorithm and its proof of correctness.

In certain cases, like Brownian motion, there are additional ways to create this state $\sigma'$. For example, to simulate Brownian motion, first prepare a state $$|v\rangle = \sum_i a_i |i\rangle,$$

of independent identically distributed N(0,1) Gaussians by the above recipe, i.e. ignore the decay in the norm of the Gaussian entries in the Brownian motion's DCT. (As discussed above this state may be easy to prepare as the corresponding distribution D' on angles is a product distribution (i.e. is independent) over the different angles.). We then perform the following algorithm to "add back in" the decay of norms: create the state $$|K\rangle = \sum_k 1/k |k\rangle$$

using the data loader. Now given $|K\rangle |v\rangle$, compute the difference of the two registers, producing the state $$\sum_{j,k} a_{k+j \bmod N} / k |k, j\rangle.$$

Since the $\alpha_{k+j} \bmod N$ are still independent Gaussians, (as the independent Gaussian distribution is invariant under permuting entries) the amplitudes of this state are distributed as independent Gaussians divided by a normalization factor, and this therefore prepares the state $\sigma'$ corresponding to Brownian motion as desired.

Next, we discuss how one deals with the normalization of the vectors involved (e.g., all vectors involved in the algorithm). In the above description we assumed the price trajectories are of unit norm when expressed as analogue vectors $|\Psi_{traj}\rangle$. But this may not be the case for certain stochastic processes. To correct for this, we use concentration of measure to argue that for typical price trajectories in stochastic processes, the norms of the trajectories (or equivalently, the norms of the Fourier series) are highly concentrated. We then therefore fix a normalization factor N in advance, assume the norm of the price trajectories is less than this normalization factor, and ignore the rare trajectories where the stochastic process violates this norm condition. The value of the normalization factor N can be set according to the user's desired level of accuracy.

We now succinctly summarize the method as follows. The method may be performed by a computing system (e.g., including a classical computing system and a quantum computing system). See FIG. 2 for an example flowchart illustrating this method.

Begin with the stochastic process of price trajectories one wishes to model—e.g., the distribution on functions price(t).

Analytically take the DCT of this stochastic process. This is established for many stochastic processes in the mathematics literature, for example the DCT of Brownian motion is given by its Wiener series. This gives a probability distribution on the DCT coefficients $a_0, a_1, a_2, \ldots$ of the stochastic process.

Truncate the DCT series at a finite value of k.

Analytically compute the inverse map to determine the distribution of data loader angles D' which, after passing through the data loader A, creates this truncated DCT series.

Using a classical computing system, compute the data loader angles $|\varphi i\rangle$ which load the classical probability D' as a quantum state.

Execute the quantum algorithm to prepare the state $\rho'$ (an approximation to $\rho$) as follows in Steps A-C:

Step A: Run the data loader A on $|\varphi\rangle$ to produce the state $|D'\rangle$ Step B: Run the data loader A again on $|D'\rangle$ to produce the state $\sigma'$, which by construction is a close approximation to $\sigma$.

Step C: Apply the DCT algorithm to $\sigma'$ to produce $\rho'$, a close approximation to $\rho$ (e.g., within a threshold error or percentage (e.g., if k=200 for Brownian motion, the error is 0.3 per cent.)).

In some embodiments, the last steps (Steps A-C) are run on the quantum computing system. The other steps may be pre-computations performed analytically, once per each stochastic process one wishes to model.

Figure 2:
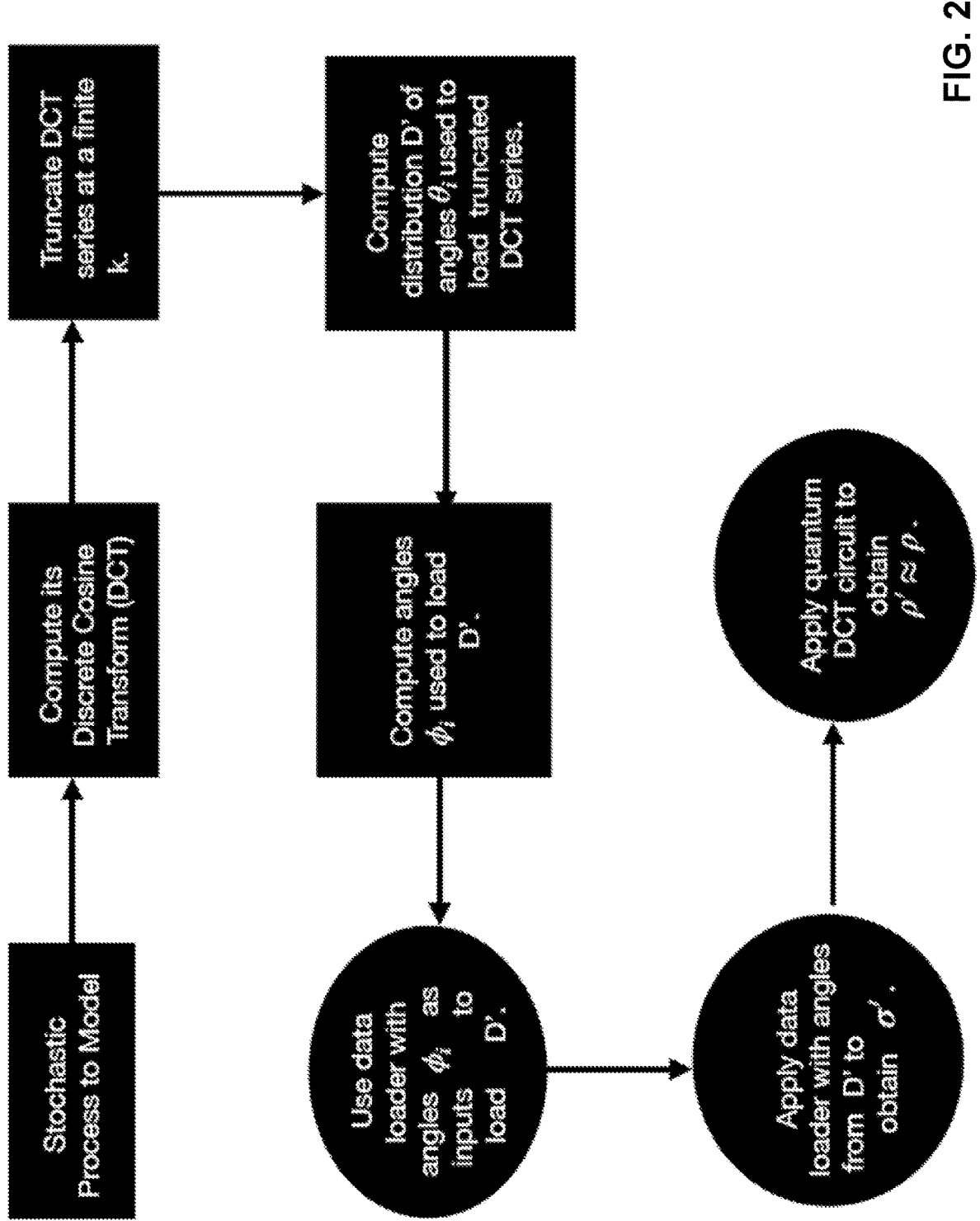
FIG. 2 is a flowchart of a method for simulating a stochastic process using a quantum computing system, according to an embodiment.

FIGS. 1 and 2 are now described. FIG. 1 is an example quantum circuit diagram of an implementation of the algorithm, according to an embodiment. The circuit diagram reads from left to right, and the quantum state at the corresponding points on the circuit is labelled on the line above. First, a number of qubits are prepared in the $|0\rangle$ basis state. Second, the data loader algorithm (denoted "DL") is applied to k different 1-qubit registers, to load the distribution of angles D' for each angle required for the generation of the Fourier series described in the full application (e.g., the distribution input angles to the data loader, such that running the data loader on this distribution yields $\sigma'$). Note that k is the number of terms in the Fourier series (e.g., k=200) and I corresponds to the precision for the angles (e.g., I=10 may be a good choice). In this example, the distribution of angles is assumed to be independent, so the DL algorithm is applied separately on each angle register, but that may not necessarily the case for all implementations. Third, the data loader algorithm is applied again to these angle registers to prepare the density matrix $\sigma'$. Fourth, the DCT algorithm is applied to $\sigma'$ to produce the density matrix $\rho'$ (which is a close approximation to $\sigma$). The output of the circuit in FIG. 1 is $\rho'$.

FIG. 2 is a flowchart of a method for simulating a stochastic process using a quantum computing system, according to an embodiment. The steps denoted in rectangles may be precomputed on a quantum or classical computing system and may only need to be performed once per stochastic process one wishes to model. The steps denoted in ovals are performed on a quantum computing system. These steps may be performed each time one wishes to simulate the stochastic process.

Example Method

FIG. 3 is a flowchart describing another method 300 for simulating a stochastic process using a quantum computing system, according to an embodiment. The steps of FIG. 3 are described from the perspective of a computing system (e.g., including a classical computing system and a quantum computing system). However, some or all of the steps may be performed by other entities or components. In addition, some embodiments may perform the steps in parallel, perform the steps in different orders, or perform different steps. One or more steps of the method 300 may be stored as instructions in a non-transitory computer-readable storage medium.

The computing system receives 310 a stochastic process with a plurality of trajectories over time t.

The computing system determines 320 a first quantum circuit that, when executed by a quantum computing system, prepares a mixed quantum state ρ' in the quantum computing system, where ρ' approximates a mixed quantum state of the stochastic process and is defined by:

$$\rho = \sum_{traj} Pr[traj] |\psi_{traj}\rangle\langle\psi_{traj}|,$$

where Pr[traj] is a probability of a trajectory of the stochastic process, $|\psi_{traj}\rangle$ is a quantum state representing a trajectory of the stochastic process and is defined by $$|\psi_{traj}\rangle = \sum_{t} f(t) |t\rangle,$$

where $f(t)$ is based on a value of the stochastic process at time t. In some embodiments, the method of claim 1, wherein $|\psi_{traj}\rangle$ represents the trajectory of the stochastic process overall all possible times t.

In some embodiments, determining the first quantum circuit comprises: determining a discrete cosine transform (DCT) series of the stochastic process; determining a probability distribution for coefficients in the DCT series; and determining a probability distribution of angles D', the probability distribution of angles D' being parameter values for a first data loader quantum circuit that is configured to, when executed by the quantum computing system, generate a mixed quantum state σ' corresponding to a vector of the coefficients in the DCT series. The determined discrete cosine transform (DCT) series may be truncated to have a finite number of coefficients (the number of coefficients is greater than zero). In some embodiments, determining the probability distribution for coefficients in the DCT series comprises determining a probability distribution for each coefficient in the DCT series. Determining the first quantum circuit may further include: determining sets of parameter values for a set of data loader quantum circuits configured to, when executed by the quantum computing system, generate a quantum state |D'⟩ representing the probability distribution over the angles (quantum state |D'⟩) may be used by a data loader circuit for generated the quantum representation of the DCT series). In some embodiments, the computing system executes the first quantum circuit to generate the mixed quantum state ρ'. Executing the first quantum circuit may include: executing the set of data loader quantum circuits to generate the quantum state |D'⟩ ; applying the first data loader quantum circuit to the quantum state D' to generate the mixed quantum state σ'; and applying a DCT quantum circuit to the mixed quantum state σ' to generate the mixed quantum state ρ'.

Description of a Computing System

Figure 4A:
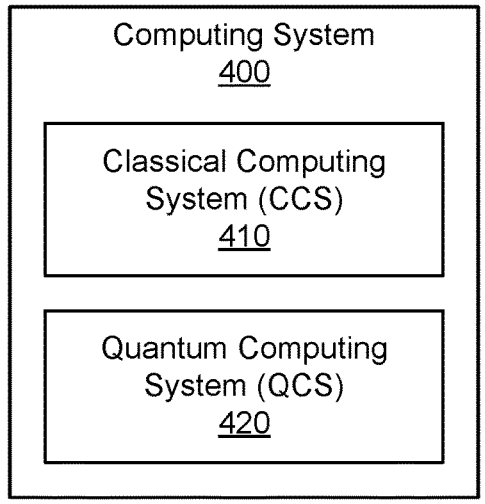
FIG. 4A is a block diagram that illustrates an embodiment of a computing system.

FIG. 4A is a block diagram that illustrates an embodiment of a computing system 400. In the example of FIG. 4A, the computing system 400 includes a classical computing system 410 (also referred to as a non-quantum computing system) and a quantum computing system 420, however a computing system may just include a classical computing system or a quantum computing system. The classical computing system 410 may control the quantum computing system 420. An embodiment of the classical computing system 410 is described further with respect to FIG. 5. While the classical computing system 410 and quantum computing system 420 are illustrated together, they may be physically separate systems (e.g., in a cloud architecture). In other embodiments, the computing system 400 includes different or additional elements (e.g., multiple quantum computing systems 420). In addition, the functions may be distributed among the elements in a different manner than described.

Figure 4B:
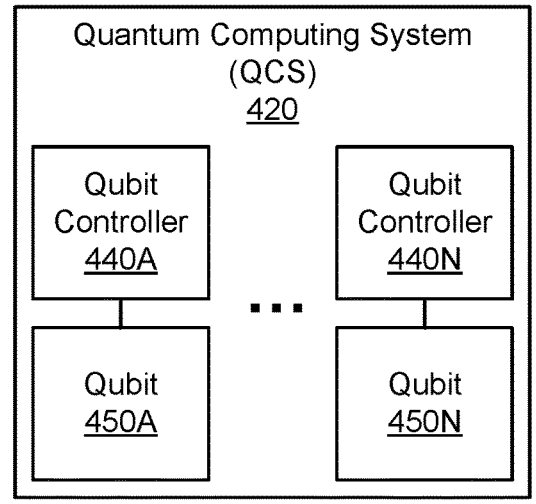
FIGS. 4B-4C are block diagrams that illustrate embodiments of a quantum computing system.
Figure 4C:
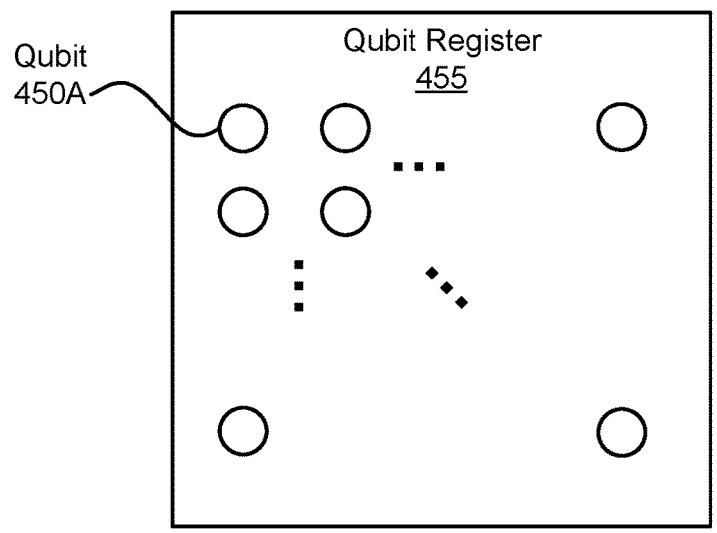

FIG. 4B is a block diagram that illustrates an embodiment of the quantum computing system 420. The quantum computing system 420 includes any number of quantum bits ("qubits") 450 and associated qubit controllers 440. As illustrated in FIG. 4C, the qubits 150 may be in a qubit register of the quantum computing system 420. Qubits are further described below. A qubit controller 440 is a module that controls one or more qubits 450. A qubit controller 440 may include a classical processor such as a CPU, GPU, or FPGA. A qubit controller 440 may perform physical operations on one or more qubits 450 (e.g., it can perform quantum gate operations on a qubit 440). In the example of FIG. 4B, a separate qubit controller 440 is illustrated for each qubit 450, however a qubit controller 450 may control multiple (e.g., all) qubits 450 of the quantum computing system 420 or multiple controllers 450 may control a single qubit. For example, the qubit controllers 450 can be separate processors, parallel threads on the same processor, or some combination of both. In other embodiments, the quantum computing system 420 includes different or additional elements. In addition, the functions may be distributed among the elements in a different manner than described.

Figure 4D:
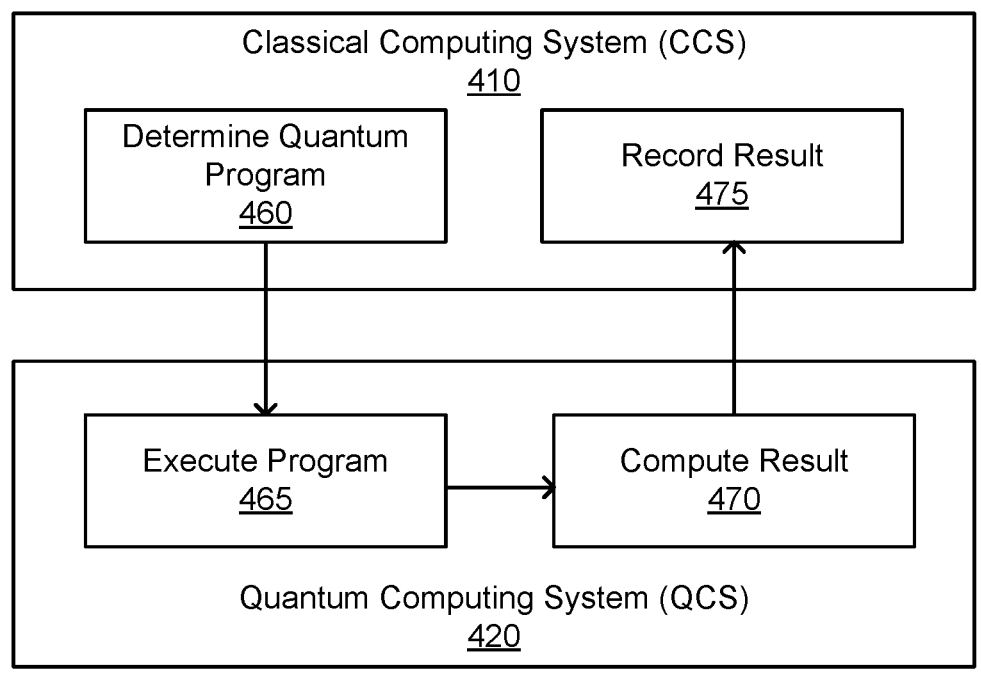
FIG. 4D is a flow chart that illustrates an example execution of a quantum routine on the computing system.

FIG. 4D is a flow chart that illustrates an example execution of a quantum routine on the computing system 400. The classical computing system 410 generates 460 a quantum program to be executed or processed by the quantum computing system 420. The quantum program may include instructions or subroutines to be performed by the quantum computing system 420. In an example, the quantum program is a quantum circuit. This program can be represented mathematically in a quantum programming language or intermediate representation such as QASM or Quil.

The quantum computing system 420 executes 465 the program and computes 470 a result (referred to as a shot or run). Computing the result may include performing a measurement of a quantum state generated by the quantum computing system 420 that resulted from executing the program. Practically, this may be performed by measuring values of one or more of the qubits 450. The quantum computing system 420 typically performs multiple shots to accumulate statistics from probabilistic execution. The number of shots and any changes that occur between shots (e.g., parameter changes)) may be referred to as a schedule. The schedule may be specified by the program. The result (or accumulated results) is recorded 475 by the classical computing system 410. Results may be returned after a termination condition is met (e.g., a threshold number of shots occur).

Figure 5:
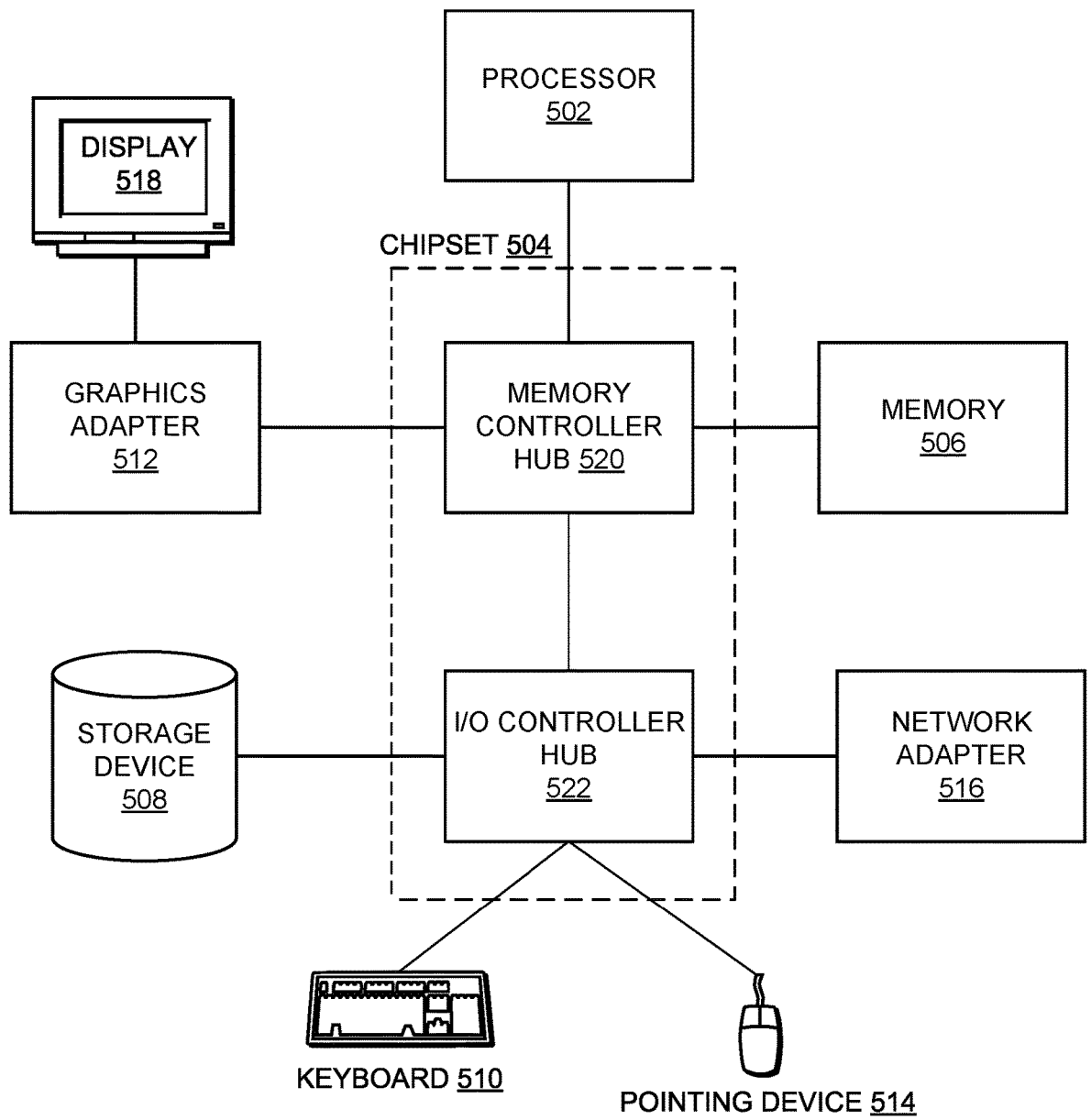
FIG. 5 is an example architecture of a classical computing system.

FIG. 5 is an example architecture of a classical computing system 410, according to an embodiment. The quantum computing system 420 may also have one or more components described with respect to FIG. 5. Although FIG. 5 depicts a high-level block diagram illustrating physical components of a computing system used as part or all of one or more entities described herein, in accordance with an embodiment. A computing system may have additional, less, or variations of the components provided in FIG. 5. Although FIG. 5 depicts a computing system 500, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 5 are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O hub 522. In another embodiment, the memory 506 is coupled directly to the processor 502 instead of the chipset 504. In some embodiments, the computing system 500 includes one or more communication buses for interconnecting these components. The one or more communication buses optionally include circuitry (sometimes called a chipset) that interconnects and controls communications between system components.

The storage device 508 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 508 can also be referred to as persistent memory. The pointing device 514 may be a mouse, track ball, or other type of pointing device, and is used in combination with the keyboard 510 to input data into the computing system 500. The graphics adapter 512 displays images and other information on the display 518. The network adapter 516 couples the computing system 500 to a local or wide area network.

The memory 506 holds instructions and data used by the processor 502. The memory 506 can be non-persistent memory, examples of which include high-speed random access memory, such as DRAM, SRAM, DDR RAM, ROM, EEPROM, flash memory.

As is known in the art, a computing system 500 can have different or other components than those shown in FIG. 5. In addition, the computing system 500 can lack certain illustrated components. In one embodiment, a computing system 500 acting as a server may lack a keyboard 510, pointing device 514, graphics adapter 512, or display 518. Moreover, the storage device 508 can be local or remote from the computing system 500 (such as embodied within a storage area network (SAN)).

As is known in the art, the computing system 500 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 508, loaded into the memory 506, and executed by the processor 302.

Referring back to FIGS. 4A-4C, the quantum computing system exploits the laws of quantum mechanics in order to perform computations. A quantum processing device, quantum computer, quantum processor, and quantum processing unit are each examples of a quantum computing system. A quantum computing system can be a universal or a non-universal quantum processing device (a universal quantum device can execute any possible quantum circuit (subject to the constraint that the circuit doesn't use more qubits than the quantum device possesses)). Quantum processing devices commonly use so-called qubits, or quantum bits. While a classical bit always has a value of either 0 or 1, a qubit is a quantum mechanical system that can have a value of 0, 1, or a superposition of both values. Example physical implementations of qubits include superconducting qubits, spin qubits, trapped ions, arrays of neutral atoms, and photonic systems (e.g., photons in waveguides). For the purposes of this disclosure, a qubit may be realized by a single physical qubit or as an error-protected logical qubit that itself comprises multiple physical qubits. The disclosure is also not specific to qubits. The disclosure may be generalized to apply to quantum processors whose building blocks are qudits (d-level quantum systems, where d>2) or quantum continuous variables, rather than qubits.

A quantum circuit is an ordered collection of one or more gates. A sub-circuit may refer to a circuit that is a part of a larger circuit. A gate represents a unitary operation performed on one or more qubits. Quantum gates may be described using unitary matrices. The depth of a quantum circuit is the least number of steps needed to execute the circuit on a quantum computing system. The depth of a quantum circuit may be smaller than the total number of gates because gates acting on non-overlapping subsets of qubits may be executed in parallel. A layer of a quantum circuit may refer to a step of the circuit, during which multiple gates may be executed in parallel. In some embodiments, a quantum circuit is executed by a quantum computing system. In this sense a quantum circuit can be thought of as comprising a set of instructions or operations that a quantum computing system can execute. To execute a quantum circuit on a quantum computing system, a user may inform the quantum computing system what circuit is to be executed. A quantum computing system may include both a core quantum device and a classical peripheral/control device (e.g., a qubit controller) that is used to orchestrate the control of the quantum device. It is to this classical control device that the description of a quantum circuit may be sent when one seeks to have a quantum computing system execute a circuit.

A variational quantum circuit may refer to a parameterized quantum circuit that is executed many times, where each time some of the parameter values may be varied. The parameters of a parameterized quantum circuit may refer to parameters of the gate unitary matrices. For example, a gate that performs a rotation about the y axis may be parameterized by a real number that describes the angle of the rotation. Variational quantum algorithms are a class of hybrid quantum-classical algorithm in which a classical computing system is used to choose and vary the parameters of a variational quantum circuit. Typically, the classical processor updates the variational parameters based on the outcomes of measurements of previous executions of the parameterized circuit.

The description of a quantum circuit to be executed on one or more quantum computing systems may be stored in a non-transitory computer-readable storage medium. The term "computer-readable storage medium" should be taken to include a single medium or multiple media (e.g., a centralized or distributed database, or associated caches and servers) able to store instructions. The term "computer-readable medium" shall also be taken to include any medium that is capable of storing instructions for execution by the quantum computing system and that cause the quantum computing system to perform any one or more of the methodologies disclosed herein. The term "computer-readable medium" includes, but is not limited to, data repositories in the form of solid-state memories, optical media, and magnetic media.

The approaches described above may be amenable to a cloud quantum computing system, where quantum computing is provided as a shared service to separate users. One example is described in patent application Ser. No. 15/446,973, "Quantum Computing as a Service," which is incorporated herein by reference.

Additional Considerations

The disclosure above describes example embodiments for purposes of illustration only. Any features that are described as essential, important, or otherwise implied to be required should be interpreted as only being required for that embodiment and are not necessarily included in other embodiments.

Additionally, the above disclosure often uses the phrase "we" (and other similar phases) to reference an entity that is performing an operation (e.g., a step in an algorithm). These phrases are used for convenience. These phrases may refer to a computing system (e.g., including a classical computing system and a quantum computing system) that is performing the described operations.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. As used herein, 'processor' may refer to one or more processors. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the above description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the methods and apparatuses disclosed herein without departing from the spirit and scope of the invention.

What is claimed is:

1. A method comprising:
   receiving a stochastic process with a plurality of trajectories over time t;
   determining a first quantum circuit that, when executed by a quantum computing system, prepares a mixed quantum state $\rho'$ in the quantum computing system, where $\rho'$ approximates a mixed quantum state of the stochastic process and is defined by:

$$\rho = \sum_{traj} Pr[traj] |\psi_{traj}\rangle\langle\psi_{traj}|,$$

wherein Pr[traj] is a probability of a trajectory of the stochastic process, $|\psi_{traj}\rangle$ is a quantum state representing a trajectory of the stochastic process and is defined by $$|\psi_{traj}\rangle = \sum_t f(t)|t\rangle,$$

where $f(t)$ is based on a value of the stochastic process at time t; and
   executing the first quantum circuit to generate the mixed quantum state $\rho'$.

2. The method of claim 1, wherein determining the first quantum circuit comprises:
   determining a discrete cosine transform (DCT) series of the stochastic process;
   determining a probability distribution for coefficients in the DCT series; and
   determining a probability distribution of angles D', the probability distribution of angles D' being parameter values for a first data loader quantum circuit that is configured to, when executed by the quantum computing system, generate a mixed quantum state $\sigma'$ corresponding to a vector of the coefficients in the DCT series.

3. The method of claim 2, wherein the determined discrete cosine transform (DCT) series is truncated to have a finite number of coefficients.

4. The method of claim 2, wherein determining the probability distribution for coefficients in the DCT series comprises determining a probability distribution for each coefficient in the DCT series.

5. The method of claim 2, wherein determining the first quantum circuit further comprises:
   determining sets of parameter values for a set of data loader quantum circuits configured to, when executed by the quantum computing system, generate a quantum state |D'⟩ representing the probability distribution over the angles.

6. The method of claim 5, wherein executing the first quantum circuit comprises:
   executing the set of data loader quantum circuits to generate the quantum state |D'⟩;
   applying the first data loader quantum circuit to the quantum state D' to generate the mixed quantum state $\sigma'$; and applying a DCT quantum circuit to the mixed quantum state $\sigma'$ to generate the mixed quantum state $\rho'$.

7. The method of claim 1, wherein $|\psi_{traj}\rangle$ represents the trajectory of the stochastic process overall all possible times t.

8. A non-transitory computer-readable storage medium comprising stored instructions that, when executed by a computing system, cause the computing system to perform operations including:
   receiving a stochastic process with a plurality of trajectories over time t;
   determining a first quantum circuit that, when executed by a quantum computing system, prepares a mixed quantum state $\rho'$ in the quantum computing system, where $\rho'$ approximates a mixed quantum stated of the stochastic process and is defined by:

$$\rho = \sum_{traj} Pr[traj] |\psi_{traj}\rangle\langle\psi_{traj}|,$$

wherein Pr[traj] is a probability of a trajectory of the stochastic process, $|\psi_{traj}\rangle$ is a quantum state representing a trajectory of the stochastic process and is defined by $$|\psi_{traj}\rangle = \sum_t f(t)|t\rangle,$$

where $f(t)$ is based on a value of the stochastic process at time t; and
   executing the first quantum circuit to generate the mixed quantum state $\rho'$.

9. The non-transitory computer-readable storage medium of claim 8, wherein determining the first quantum circuit comprises:
   determining a discrete cosine transform (DCT) series of the stochastic process;
   determining a probability distribution for coefficients in the DCT series; and
   determining a probability distribution of angles D', the probability distribution of angles D' being parameter values for a first data loader quantum circuit that is configured to, when executed by the quantum computing system, generate a mixed quantum state $\sigma'$ corresponding to a vector of the coefficients in the DCT series.

10. The non-transitory computer-readable storage medium of claim 9, wherein the determined discrete cosine transform (DCT) series is truncated to have a finite number of coefficients.

11. The non-transitory computer-readable storage medium of claim 9, wherein determining the probability distribution for coefficients in the DCT series comprises determining a probability distribution for each coefficient in the DCT series.

12. The non-transitory computer-readable storage medium of claim 9, wherein determining the first quantum circuit further comprises:
    determining sets of parameter values for a set of data loader quantum circuits configured to, when executed by the quantum computing system, generate a quantum state |D'θ representing the probability distribution over the angles.

13. The non-transitory computer-readable storage medium of claim 12, wherein executing the first quantum circuit comprises:
  executing the set of data loader quantum circuits to generate the quantum state |D'⟩;
  applying the first data loader quantum circuit to the quantum state D' to generate the mixed quantum state σ'; and
  applying a DCT quantum circuit to the mixed quantum state σ' to generate the mixed quantum state ρ'.

14. The non-transitory computer-readable storage medium of claim 8, wherein $|\psi_{traj}\rangle$ represents the trajectory of the stochastic process overall all possible times t.

15. A quantum circuit that, when executed by a quantum computing system, prepares a mixed quantum state ρ' in the quantum computing system, where ρ' approximates a mixed quantum stated of a stochastic process with a plurality of trajectories over time t and is defined by:

$$\rho = \sum_{traj} Pr[traj] |\psi_{traj}\rangle\langle\psi_{traj}|,$$

wherein Pr[traj] is a probability of a trajectory of the stochastic process, $|\psi_{traj}\rangle$ is a quantum state representing a trajectory of the stochastic process and is defined by $$|\psi_{traj}\rangle = \sum_t f(t)|t\rangle,$$

where $f(t)$ is based on a value of the stochastic process at time t, wherein the quantum circuit is executed by the quantum computing system to generate the mixed quantum state ρ'.

16. The quantum circuit of claim 15, wherein the quantum circuit is determined by a method comprising:
  determining a discrete cosine transform (DCT) series of the stochastic process;
  determining a probability distribution for coefficients in the DCT series; and
  determining a probability distribution of angles D', the probability distribution of angles D' being parameter values for a first data loader quantum circuit that is configured to, when executed by the quantum computing system, generate a mixed quantum state σ' corresponding to a vector of the coefficients in the DCT series.

17. The quantum circuit of claim 16, wherein the determined discrete cosine transform (DCT) series is truncated to have a finite number of coefficients.

18. The quantum circuit of claim 15, wherein $|\psi_{traj}\rangle$ represents the trajectory of the stochastic process overall all possible times t.

19. The quantum circuit of claim 16, wherein determining the probability distribution for coefficients in the DCT series comprises determining a probability distribution for each coefficient in the DCT series.

20. The quantum circuit of claim 16, wherein determining the quantum circuit further comprises:
  determining sets of parameter values for a set of data loader quantum circuits configured to, when executed by the quantum computing system, generate a quantum state |D'⟩ representing the probability distribution over the angles.

* * * * *